United States Patent

Sohfuku

(10) Patent No.: US 7,446,722 B2
(45) Date of Patent: Nov. 4, 2008

(54) TELESCOPE SYSTEM

(75) Inventor: Satoru Sohfuku, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 380 days.

(21) Appl. No.: 11/379,142

(22) Filed: Apr. 18, 2006

(65) Prior Publication Data

US 2007/0097004 A1    May 3, 2007

(30) Foreign Application Priority Data

Nov. 2, 2005    (JP)    ............................ 2005-319859

(51) Int. Cl.
*H01Q 3/00*    (2006.01)
(52) U.S. Cl. ........................ 343/757; 343/766; 343/758
(58) Field of Classification Search ................. 343/757, 343/758, 761, 765, 766
See application file for complete search history.

(56) References Cited

U.S. PATENT DOCUMENTS 3,546,704 A * 12/1970 Selby et al. ................. 343/765
4,086,599 A * 4/1978 VanderLinden et al. ..... 343/881
2003/0107525 A1 * 6/2003 Ehrenberg et al. .......... 343/881
2006/0114164 A1 * 6/2006 Iluz et al. .................... 343/757

FOREIGN PATENT DOCUMENTS

JP    3-3402    1/1991

* cited by examiner

*Primary Examiner*—HoangAnh T Le
(74) *Attorney, Agent, or Firm*—Oblon, Spivak, McClelland, Maier & Neustadt, P.C.

(57) ABSTRACT

There is provided a telescope system including: a main reflector unit; a pedestal unit that bears the main reflector unit to be rotatable around AZ and EL axes; and a motor that drives the main reflector unit. The telescope system corrects deformation of the main reflector unit and the pedestal unit due to the wind force to improve pointing accuracy of the mina mirror unit and the pedestal unit. The telescope system detects motor torques on the AZ axis and the EL axis, predicts deformation of a telescope due to the wind force from torque signals of the motor torques and a pointing error due to the deformation and feeds back the deformation and the pointing error to AZ and EL command values to perform correction of the pointing error.

7 Claims, 6 Drawing Sheets

| AZ | EL | Fx (Kgf) | Fy (Kgf) | Fz (Kgf) | Mx (Kgf·m) | My (Kgf·m) | Mz (Kgf·m) |
|---|---|---|---|---|---|---|---|
| 0 | 0 | 7.9 | -479.9 | -37.3 | -340.0 | 25.8 | 38.7 |
| 60 | 0 | -61.0 | -298.4 | 42.3 | 241.0 | 21.5 | 210.9 |
| 120 | 0 | -96.1 | 98.6 | 30.8 | 133.4 | -25.8 | 538.0 |
| 180 | 0 | 1.8 | 249.3 | -27.3 | -103.3 | -21.5 | -56.0 |
| 45 | 45 | -24.0 | -264.0 | -201.2 | -34.4 | 0.0 | 30.1 |
| 135 | 45 | -73.9 | 128.4 | 47.0 | -223.8 | -284.1 | 262.6 |
| 0 | 60 | 6.5 | -208.4 | -220.9 | -17.2 | 25.8 | 4.3 |
| 90 | 60 | -94.3 | 25.8 | 36.9 | -4.3 | -516.5 | 297.0 |
| 180 | 60 | -2.2 | 135.9 | 13.6 | -460.6 | -12.9 | -17.2 |
| 90 | 90 | -90.7 | -2.2 | 36.6 | 12.9 | -555.2 | 0.0 |
| 0 | 90 | 2.2 | -97.9 | 79.6 | 490.7 | 25.8 | 8.6 |

FIG. 6

| TELESCOPE DIRECTION | | PEDESTAL UNIT | | MAIN MIRROR UNIT (MAIN MIRROR + SUB-MIRROR) | | MAIN MIRROR UNIT + PEDESTAL UNIT | |
|---|---|---|---|---|---|---|---|
| AZ | EL | θy (Az) [ARCSEC] | θx (El) [ARCSEC] | θy (Az) [ARCSEC] | θx (El) [ARCSEC] | θy (Az) [ARCSEC] | θx (El) [ARCSEC] |
| 0 | 0 | (y1) 0.13 | 2.04 | (y2) 2.27E-02 | 3.77E-01 | (y3) 1.57E-01 | 1.70E+00 |
| 60 | 0 | 0.49 | 1.57 | 8.00E-01 | 9.80E-01 | 1.29E+00 | 2.55E+00 |
| 120 | 0 | 1.13 | -1.24 | 1.608 | 3.45E-01 | 2.74E+00 | -8.92E-01 |
| 180 | 0 | -0.15 | -1.38 | -4.53E-04 | -3.19E-01 | -1.47E-01 | -1.70E+00 |
| 45 | 45 | 0.14 | 1.30 | 4.81E-01 | 6.46E-01 | 6.17E-01 | 1.95E+00 |
| 135 | 45 | 0.76 | -1.43 | 1.18E+00 | -7.65E-01 | 1.94E+00 | -2.20E+00 |
| 0 | 60 | -0.02 | 1.08 | -4.04E-02 | 6.88E-01 | -6.25E-02 | 1.76E+00 |
| 90 | 60 | 1.02 | -0.65 | 2.30E+00 | 9.18E-02 | 3.31E+00 | -5.57E-01 |
| 180 | 60 | -0.01 | -1.33 | -9.01E-03 | -1.53E+00 | -2.24E-02 | -2.85E+00 |
| 90 | 90 | 0.80 | 0.01 | 2.26E+00 | 7.53E-02 | 3.06E+00 | 8.23E-02 |
| 0 | 90 | -0.03 | 1.18 | -2.88E-02 | 2.16E+00 | -5.56E-02 | 3.34E+00 |
| α | | 0.65 | 1.24 | 1.29 | 0.82 | 1.93 | 1.93 |
| β | | 1.40 | | 1.53 | | 2.72 | |

FIG. 7

| TELESCOPE DIRECTION | | PEDESTAL UNIT | | MAIN MIRROR UNIT (MAIN MIRROR + SUB-MIRROR) | | MAIN MIRROR UNIT + PEDESTAL UNIT | |
|---|---|---|---|---|---|---|---|
| AZ | EL | θy (Az) [ARCSEC] | θx (El) [ARCSEC] | θy (Az) [ARCSEC] | θx (El) [ARCSEC] | θy (Az) [ARCSEC] | θx (El) [ARCSEC] |
| 0 | 0 | -0.17 | 3.65 | 2.27E-02 | -3.77E-01 | -1.44E-01 | 3.32E+00 |
| 60 | 0 | -1.14 | 0.35 | 8.00E-01 | 9.80E-01 | -3.45E-01 | 1.33E+00 |
| 120 | 0 | -3.05 | -1.02 | 1.608 | 3.45E-01 | -1.44E+00 | -6.72E-01 |
| 180 | 0 | 0.29 | -0.71 | -4.53E-04 | -3.19E-01 | 2.87E-01 | -1.03E+00 |
| 45 | 45 | -0.10 | 1.35 | 4.81E-01 | 6.46E-01 | 3.83E-01 | 2.00E+00 |
| 135 | 45 | -1.28 | 0.37 | 1.18E+00 | -7.65E-01 | -9.90E-02 | -3.99E-01 |
| 0 | 60 | -0.06 | 1.02 | -4.04E-02 | 6.88E-01 | -9.59E-02 | 1.71E+00 |
| 90 | 60 | -1.29 | -0.10 | 2.30E+00 | 9.18E-02 | 1.01E+00 | -3.86E-03 |
| 180 | 60 | 0.12 | 1.33 | -9.01E-03 | -1.53E+00 | 1.11E-01 | -1.92E-01 |
| 90 | 90 | 0.80 | -0.04 | 2.26E+00 | 7.53E-02 | 3.06E+00 | 3.37E-02 |
| 0 | 90 | -0.09 | -1.63 | -2.88E-02 | 2.16E+00 | -1.23E-01 | 5.24E-01 |
| | | 1.14 | 1.11 | 1.29 | 0.82 | 0.81 | 1.26 |
| | | 1.59 | | 1.53 | | 1.49 | |

TELESCOPE SYSTEM

BACKGROUND OF THE INVENTION

1. Field of the Invention

The present invention relates to a telescope system that corrects deformation of a pedestal unit and a main reflector unit due to the wind force to improve pointing accuracy of the pedestal unit and the main reflector unit.

2. Description of the Related Art

In the field of the radio astronomy, in recent years, there has been an increasing demand for observation of submillimeter waves that are radio waves higher in frequency than millimeter waves. In performing radio astronomical observation at high frequencies, higher accuracy is required for a main reflector (a reflecting mirror) surface of an antenna and pointing and tracking of beams. On the other hand, to improve observation efficiency, an aperture of the antenna is increased and it is desired that observation can be carried out in all kinds of weather night and day.

When the aperture of the antenna is increased, deadweight deformation of the antenna increases and thermal deformation due to the solar radiation and deformation due to the wind pressure increase. Thus, it is difficult to obtain high pointing and tracking accuracy. In order to satisfy the requirement for such high pointing and tracking accuracy, it is necessary to measure in real time a pointing error of a main reflector of a telescope system and correct the pointing error. As factors affecting the pointing error of the telescope system, there are deformation of a structural portion (a pedestal unit) that supports the main reflector and elastic deformation of the main reflector itself. The deformation due to the wind pressure is the main cause of such kinds of deformation.

Conventionally, angle information of both axes of an azimuth (AZ) and an elevation (EL) of such a large telescope system is detected by an encoder and subjected to feedback control. Thus, even if the telescope system is affected by a force of the wind, it looks as if the AZ and the EL of the telescope system can be controlled according to a command value. However, actually, the pedestal affected by the wind force is deformed. Thus, the elevation axis is tilted from a reference axis or displaced to a torsion position. In the conventional large telescope system, the deformation of the pedestals and the like is not taken into account and adversely affects the pointing accuracy. Thus, the deformation is one of causes that make it impossible to attain fixed or higher pointing accuracy.

Conventionally, as a mechanism that copes with this problem, an antenna angle detector that can detect an antenna pointing error due to elastic deformation of a pedestal is proposed (see JP-A-03-3402).

Figure 9:
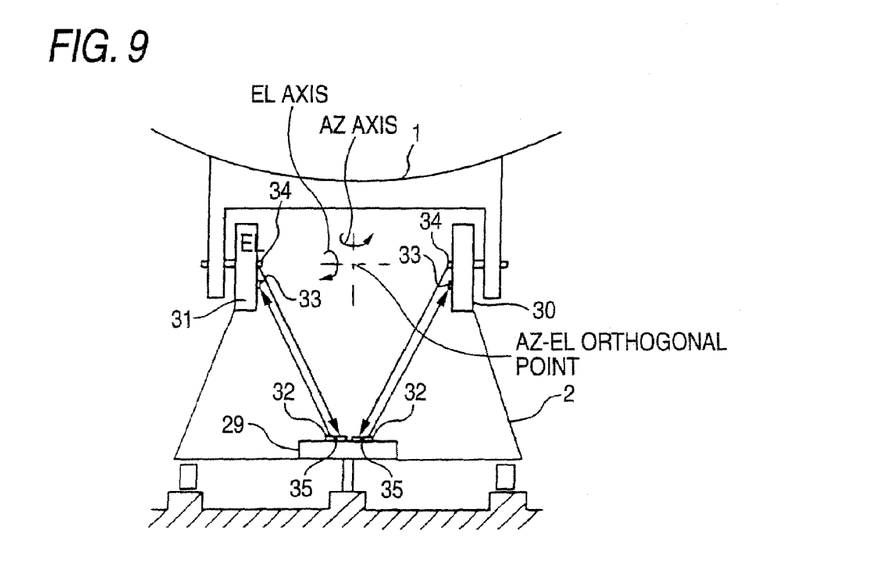
FIG. 9 is a diagram of a conventional telescope system.

FIG. 9 is a diagram of a mechanism of a conventional telescope system that can detect an antenna pointing error described in JP-A-03-3402. In FIG. 9, reference numeral 1 denotes a main reflecting mirror; 2, a pedestal unit; 29, an AZ angle detector for an antenna; 30, an EL angle detector for the antenna; 31, an EL angle detector same as the EL angle detector 30 or a mount that has a case same as that for the EL angle detector 30.

Reference numeral 32 denotes two beam generators mounted on the AZ angle detector 29 fixed to the pedestal unit 2. Reference numeral 33 denotes light position detectors for an AZ axis provided on the EL angle detector or the mount 31. Beams are irradiated on the light position detectors for an AZ axis 31 from the beam generators 32. Reference numeral 34 denotes beam generators that are provided on the EL angle detector 30 or the mount 31. Reference numeral 35 denotes light position detectors for an EL axis provided on the AZ angle detector 29. Beams from the beam generators 34 are irradiated on the light position detectors 35. The light position detectors 33 and 35 are photodiodes divided into two and are set to be sensitive only to a deviation of beams in a Y axis direction.

Operations of this system will be explained. When the pedestal unit 2 is deformed, torsion around the axes and parallel displacement occur. In the system shown in FIG. 9, the two sets of the light position detectors 33 and 35 and the beam generators 32 and 34 are provided for the AZ axis and the EL axis, respectively. Amounts of torsion around the AZ axis and the EL axis affecting a pointing error are detected by subjecting outputs of the light position detectors 33 and 35 and the beam generators 32 and 34 to arithmetic processing. The amounts of torsion of the respective axes detected in this way are added to or subtracted from angle signals detected by the EL angle detectors 30 and 31 and the AZ angle detector 29 to correct the amounts of torsion.

In the conventional antenna angle detector described above, it is logically possible to measure a pointing error of main reflecting mirror beams when torsion of the AZ axis and the EL axis due to the deformation of the pedestal unit 2 occurs. However, actually, a yoke unit, an AZ bearing, and other structure, which are not shown in the figure, are present between the beam generators 32 and 34 and the light position detectors 33 and 35. Thus, it is extremely difficult to set the light position detectors 33 and 35 not to block the beams. The beams tend to be affected by heat generation of the beam generators themselves and heat around the beam generators to cause temperature drift. This makes it difficult to determine whether an amount of thermal deformation of the pedestal unit 2 is measured or heat drift of the beams is measured.

SUMMARY OF THE INVENTION

The invention has been devised in view of such solve the problems described above and intends to provide a mechanism for detecting a force, which a main reflector unit and a pedestal unit receive from the wind, in a driving unit of a telescope system to thereby predict how the pedestal unit is deformed by the force and correct the deformation to improve directivity of the telescope system.

In order to attain the object, in the invention, there is provided a telescope system including: a main reflector unit; a pedestal unit that bears the main reflector unit to be rotatable around AZ and EL axes; and a motor that drives the main reflector unit. The telescope system corrects deformation of the main reflector unit and the pedestal unit due to the wind force to improve pointing accuracy of the main reflector unit and the pedestal unit. The telescope system detects motor torques on the AZ axis and the EL axis, predicts deformation of a telescope due to the wind force from torque signals of the motor torques and a pointing error due to the deformation, and feeds back the deformation and the pointing error to AZ and EL command values to perform correction of the pointing error.

DETAILED DESCRIPTION OF THE INVENTION

First Embodiment

Figure 1:
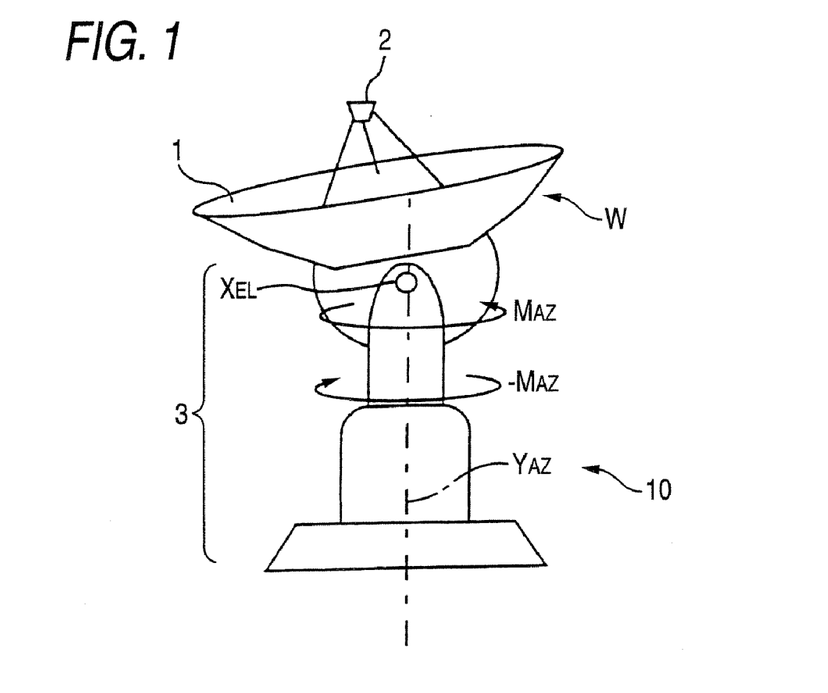
FIG. 1 is a diagram showing a state in which an altazimuth telescope system is subjected to a moment on an AZ axis by the wind force to be in torsion deformation.

A wind force metrology of a telescope system according to a first embodiment of the invention will be explained with reference to FIGS. 1 to 7. FIG. 1 is a schematic diagram showing a state in which, for example, a telescope system 10 is subjected to a moment on an AZ axis by the wind force to be in torsion deformation. The telescope system 10 includes a main reflector 1, a sub-reflector 2, and a pedestal unit 3. $X_{EL}$ represents an EL driving shaft, $Y_{AZ}$ represents an AZ driving shaft, and W represents a direction of the wind. On the AZ axis and EL axis, motors that drive the respective shafts and encoders that detect rotating positions of the motors are provided (the motors and the encoders are not shown in the figure).

Figure 2:
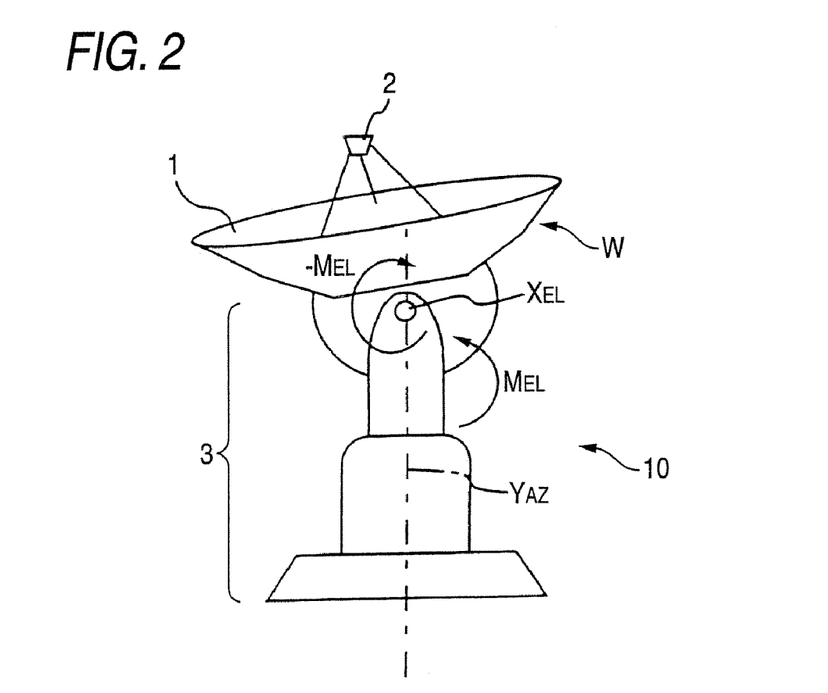
FIG. 2 is a diagram showing a state in which the altazimuth telescope system is subjected to a moment on an EL axis by the wind force to be in bending deformation.

In FIG. 1, since the telescope system receives the wind in the W direction, a moment $M_{AZ}$ is applied on the AZ axis of the telescope system. At this point, the telescope system causes the motor to output a force $M_{AZ}$ for canceling the moment $M_{AZ}$ on the AZ axis and performs feedback control to make an AZ angle detected by the encoder equal to a command value. On the other hand, FIG. 2 is a schematic diagram showing a state in which the telescope system is subjected to a moment on the EL axis by the wind force to be in bending deformation. Since the telescope system receives the wind in the W direction, a moment $M_{EL}$ is applied on the EL axis of the telescope system. Similarly, at this point, the telescope system causes the motor to output a force $M_{EL}$ for canceling the moment $M_{EL}$ and performs feedback control to make an EL angle detected by the encoder to be equal to a command value.

As described above, even if the telescope system is subjected to the wind force, it looks as if both the AZ and EL angles are controlled according to the command value. However, actually, the pedestal unit and the main reflector unit of the telescope system are deformed by receiving the wind force and the elevation axis is tilted from a reference axis or displaced to a torsion position. Thus, it is necessary to solve deterioration in the pointing accuracy due to the deformation.

Thus, in the invention, attention is paid to the fact that the moments $M_{AZ}$ and $M_{EL}$ applied to the telescope system because of the wind force are calculated from the output torques of the motors on both the AZ and EL axes. Deformation of the telescope system is calculated using the moments $M_{AZ}$ and $M_{EL}$ calculated and is fed back to the AZ and EL command values. Consequently, deterioration in directivity of the telescope system due to the influence of the wind is prevented to improve the pointing accuracy.

Figure 3:
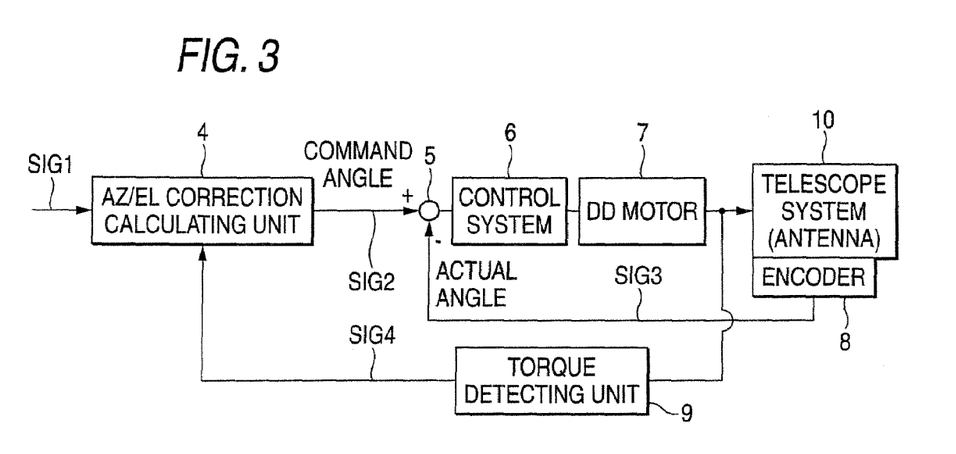
FIG. 3 is a block diagram of a telescope system including a wind force metrology system according to a first embodiment of the invention.

FIG. 3 is a block diagram of a directivity control system of the telescope system including the wind force metrology system according to the first embodiment. In the figure, reference numeral 4 denotes an AZ/EL correction calculating unit; 5, an adder; 6, a control system including an arithmetic operation unit (CPU), a Digital Signal Processor (DSP), and the like that perform control compensation and a power amplifier (a preamplifier) and the like for supplying an electric current to a motor; 7, a motor; 8, an encoder that detects rotation angles on the AZ and EL axes of the telescope system; 9, a torque detecting unit that detects motor torques on both the AZ and EL axes; and 10, a telescope system or an antenna. Reference sign SIG1 denotes AZ and EL command values; SIG2, command angle signals that are outputs of the AZ/EL correction calculating unit; SIG3, angle signals that are outputs of the encoder 8; and SIG4, torque signals that are outputs of the torque detecting unit.

As the motor 7, a motor with large friction that uses a speed reducer such as a gear is not used but a direct drive motor (hereinafter referred to as DD motor) is used to efficiently detect a driving torque due to the wind. The DD motor is a motor that does not use the speed reducer such as a gear and is directly connected to a load and operated. The DD motor has no backlash and no noise of the gear and is easily maintained. Thus, utility of the DD motor in a wide range of applications such as actuators for industrial machines and precision machines attracts attention.

The wind force metrology system according to the first embodiment will be hereinafter explained with reference to FIG. 3.

First, the AZ and EL command values SGI1 are determined on the basis of positional information of a target celestial body. The command values SIG1 are corrected to the command angle signals SIG2 by the AZ/EL correction calculating unit 4 and, then, sent to the control system 6. After the command angle signals SIG2 are subjected to amplification, voltage/current conversion, and the like in the control system 6, the command angle signals SIG2 are transmitted to the DD motor 7 (on both the AZ and EL axes). The antenna is driven by the motor 7. Rotation of the driving shafts (on both the AZ and EL axes) is derived as the actual angle signals SIG3 by the encoder 8 and the angle signals SIG 3 are fed back to the control system 6. Feedback control is performed such that the AZ and EL angle signals SIG3 detected by the encoder 8 are equal to the command values SIG2 as described above.

Moreover, in the first embodiment, in addition to the feedback control, driving torques of the motor 7 used for driving on both the AZ and EL axes are always monitored as torque current values by the torque detecting unit 9 and the torque signals SIG4 are fed back to the AZ/EL correction calculating unit 4 to correct angle command values to optimum values.

This correction operation will be hereinafter explained in detail.

First, since a torque necessary for driving the telescope system is known, Expression (1) is established.

$$T_{real} - T_{THEO} = T_{force} \tag{1}$$

where $T_{real}$ is an actual torque value, $T_{THEO}$ is an original torque value necessary for driving the telescope system, and $T_{force}$ is a torque value generated in the feedback control in order to cancel an external force acting on the telescope system.

On the other hand, since it is known that a force due to the wind is dominant as the external force acting on the telescope system, Expression (2) is established.

$$T_{real} - T_{THEO} = T_{WIND} \quad (2)$$

where $T_{WIND}$ is a torque generated to correct the force that the telescope system receives from the wind (a wind force correcting torque).

It is desirable to use the DD motor to efficiently detect the wind force correcting torque. This is because, when the motor using the speed reducer such as the gear is used, since friction of an oil seal, the gear, and the like in a gear box is large, a large amount of torque is used therefor. In addition, since the friction tends to fluctuate because of temperature and the number of years of use, fluctuation in the torque is large and the wind force correcting torque is unrecognized because of the fluctuation. As a result, it is difficult to grasp an accurate wind force correcting torque. On the other hand, in the DD motor, it is possible to directly extract an output torque. This makes it possible to obtain a more accurate wind force correcting torque.

Subsequently, a force (a direction and a magnitude) of the wind acting on the telescope system is calculated from the wind force correcting torque. Deformation of the pedestal unit of the telescope mirror system due to the wind is simulated using a so-called Finite Element Method (FEM). The FEM is one of numerical analysis methods for solving a differential equation in an approximate manner. In the FEM, an object having complicated shape and characteristics is divided into simple small portions to be approximated, whereby a behavior of the entire object is predicted. The FEM is used in various fields such as the theory of structures and the hydrodynamics.

Subsequently, a pointing error is calculated from deformation (a simulation value) of the pedestal unit of the telescope system. Assuming that there is a proportional relation between the pointing error and the force of the wind acting on the telescope system, constants (gains) with which pointing errors are minimized in total when the telescope system takes various directions and receives various winds are calculated to establish a feedback loop. Consequently, it is possible to correct deviation of the telescope system from the AZ and EL command values due to the influence of the wind force and obtain high pointing accuracy.

Figure 5:
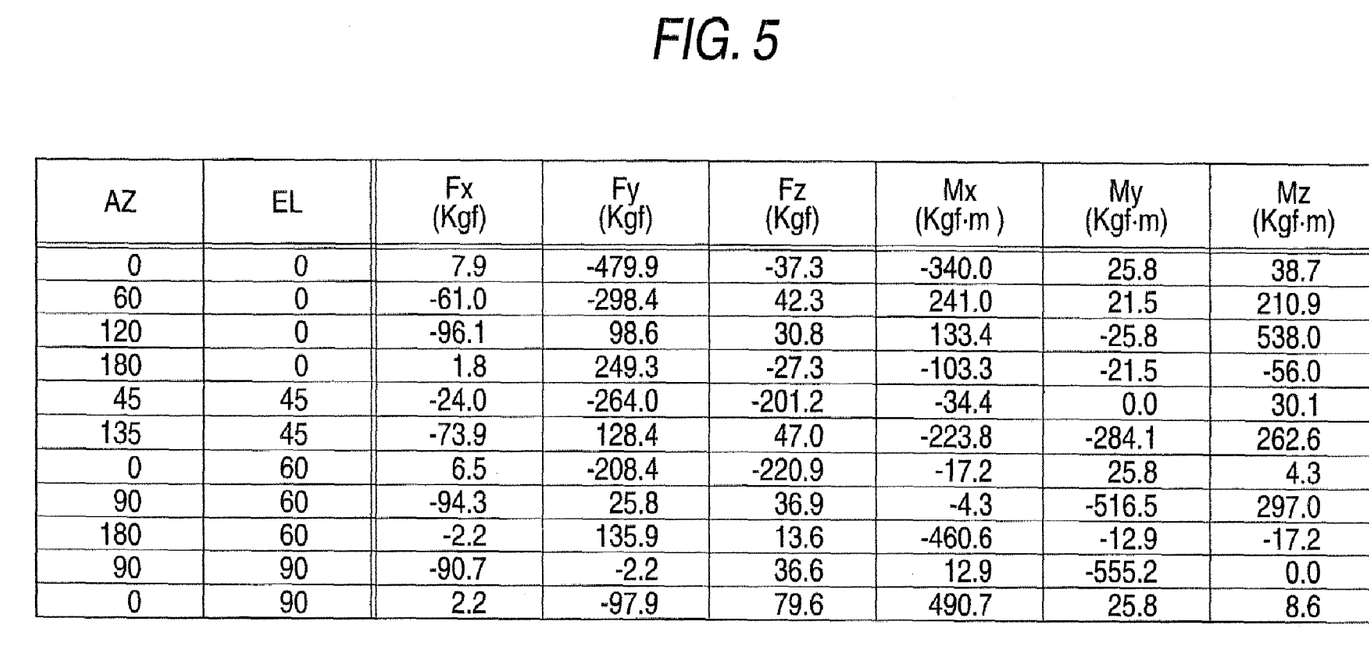
FIG. 5 is a table of results of observing, with a wind tunnel test, forces and moments applied to the telescope system in respective directions of the telescope system.

A result of performing a simulation to find to which degree directivity can be actually improved will be hereinafter described. FIG. 5 is an example of a result obtained by performing a wind tunnel test using a model of the telescope system in advance and performing observation to find what kinds of force are applied to the main reflector unit and the pedestal unit from the wind. In FIG. 5, a table shows a result of calculating, with the wind tunnel test, forces acting on the telescope system when a direction of the telescope system was changed in eleven patterns under a condition that the telescope system received the wind from a direction of an AZ angle 0° in a state in which wind velocity was 9 m/s, temperature was −20° C., and the atmospheric pressure was 0.55 atm.

Figure 4:
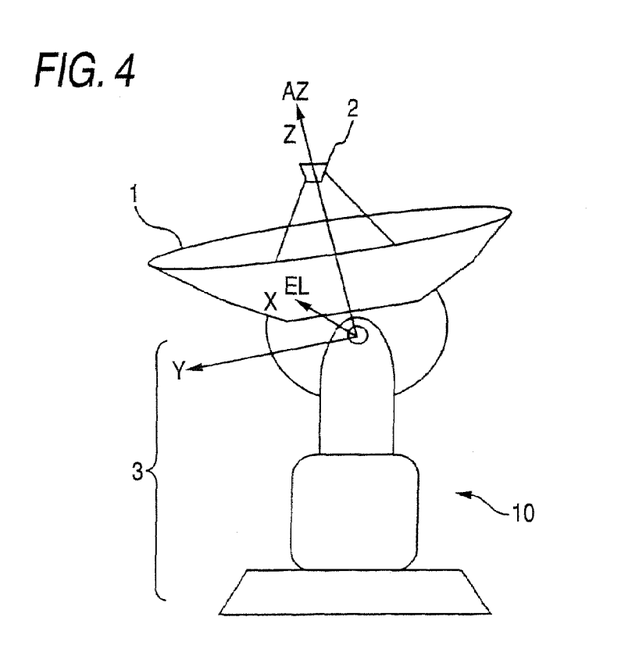
FIG. 4 is a diagram of definition of coordinates in the telescope system.

In FIG. 5, $F_X$, $F_Y$, and $F_Z$ represent forces [kgf] in X, Y, and Z directions, respectively. $M_X$, $M_Y$, and $M_Z$ represents moments [kgf·m] around X, Y, and Z axes. $M_Z$ is detected from an output on the $A_Z$ axis of the motor of the telescope system. $M_X$ is detected from an output on the EL axis of the motor of the telescope system. However, as shown in FIG. 4, as a coordinate system, with X set as an EL axis, an axis orthogonal to the X axis on the main reflector surface is defined as a Y axis and a direction orthogonal to the main reflector surface is defined as a Z axis.

Figure 6:
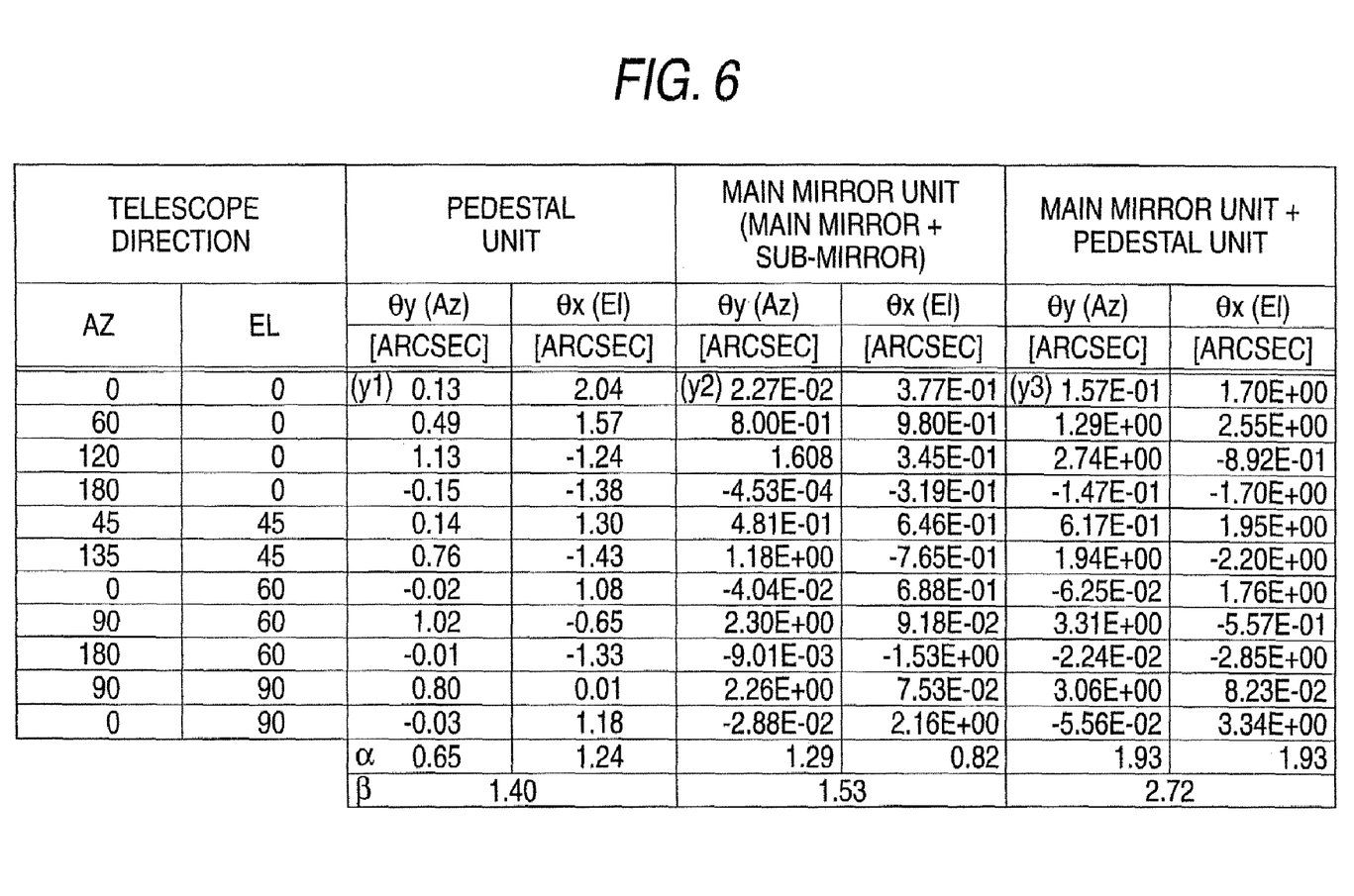
FIG. 6 is a table of deformation of the telescope system at the time when the forces in FIG. 5 were applied thereto calculated by a FEM simulation and pointing errors due to the deformation.

FIG. 6 is a result obtained by analyzing, on the basis of the measurement values in FIG. 5 and using the FEM, degrees of pointing errors caused by forces that the telescope system receives from the wind at the respective directions of the telescope system. In the figure, θy and θx represent pointing errors in [arcsec] (second of arc). An α section represents rootsum square (RSS) values of the eleven patterns and a β section represents RSS values of the RSS values. In the figure, for example, 2.27E-02 indicates $2.27 \times 10^{-2}$, that is, 0.0227. 8.00E-01 indicates $8.00 \times 10^{-1}$, that is, 0.8. In a rightmost section (main reflector unit+pedestal unit), a sum of a pointing error of the pedestal unit and a pointing error of the main reflector unit, which are shown in sections on the left of the rightmost section, is calculated (e.g., y3=y1+y2). Under the conditions in which the wind tunnel test was performed, there is a pointing error of 2.72 [arcsec] as a sum of the pointing error of the main reflector unit and the pointing error of the pedestal unit.

Figure 7:
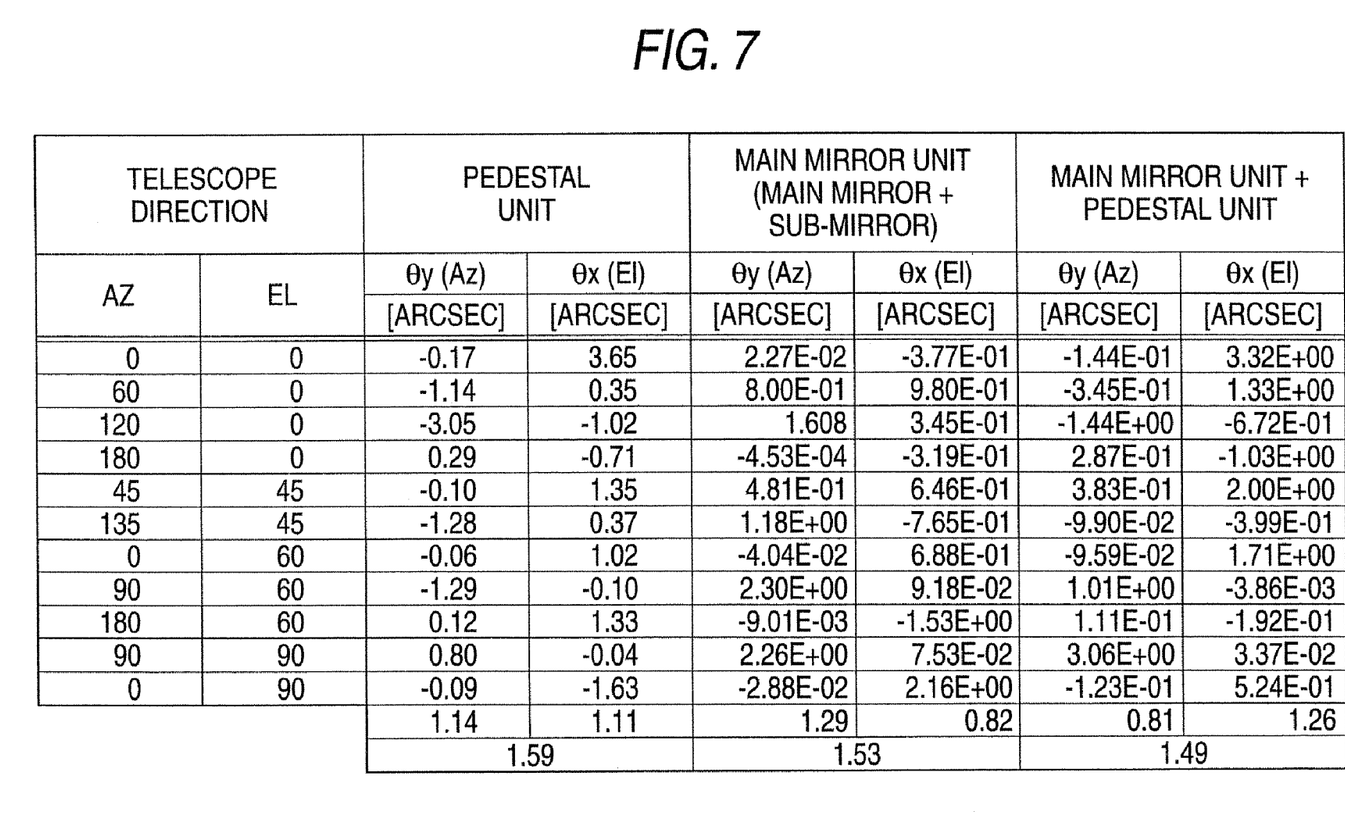
FIG. 7 is a table of pointing errors at the time when optimum feedback control was performed using the metrology system under conditions with the pointing errors in FIG. 6.

FIG. 7 is a table of a result obtained by correcting pointing errors θy(AZ) and θx(EL) on both the AZ and EL axes by performing a calculation based on Expressions (3) and (4) below. This calculation is performed by the AZ/EL correction calculating unit 4 shown in FIG. 3. In other words, the pointing errors before correction θy(AZ) and θx(EL) (FIG. 6) are corrected using products calculated by multiplying the moments $M_Z$ and $M_X$ obtained by the wind tunnel test in FIG. 5 by constants $C_{AZ}$ and $C_{EL}$.

$$θy(AZ) \text{ (after correction)} = θy(AZ) \text{ (before correction)} - C_{AZ} * M_Z \quad (3)$$

$$θx(EL) \text{ (after correction)} = θx(EL) \text{ (before correction)} - C_{EL} * M_X \quad (4)$$

In Expressions (3) and (4), assuming that there is a proportional relation between the pointing error and the force of the wind acting on the telescope system, constants (gains) with which pointing errors are minimized in total when the telescope system takes various directions and receives various winds are calculated to establish a feedback loop. In this way, when the pointing errors in the respective directions are corrected by feeding back the pointing errors to the AZ and EL command values at optimum gains using the wind force correcting torque, the total pointing error is 1.49 [arcsec] It is seen that the pointing error can be improved 40% or more.

Second Embodiment

Figure 8:
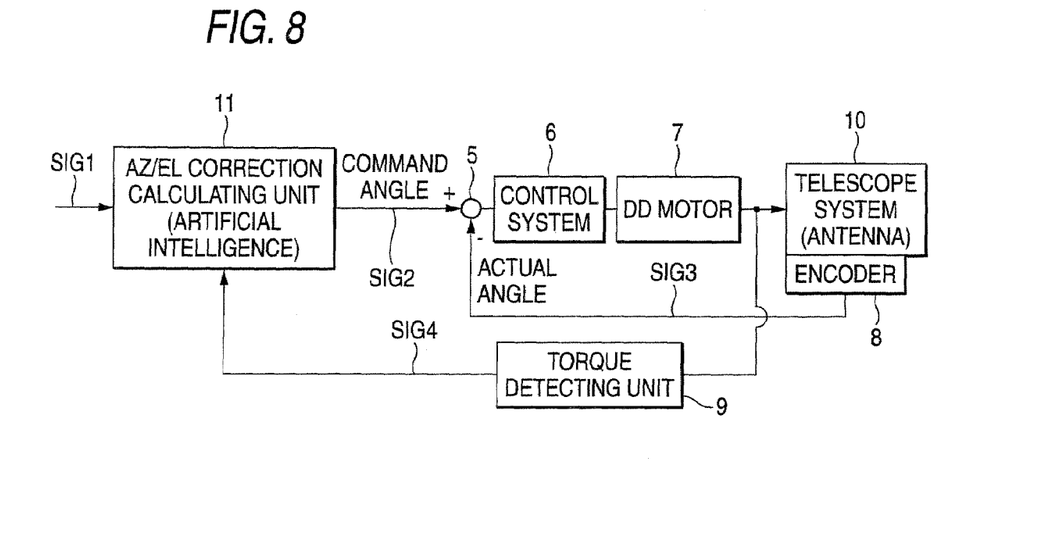
FIG. 8 is a block diagram of a telescope system including a wind force metrology system according to a second embodiment of the invention.

A telescope system according to a second embodiment of the invention will be explained with reference to FIG. 8. In FIG. 8, components identical with or equivalent to those in FIG. 3 (the first embodiment) are denoted by the identical reference numerals and signs. The telescope system in FIG. 8 is different from the telescope system in FIG. 3 in that an AZ/EL correction calculating unit 11 is constituted by a computer mounted with an artificial intelligence that performs AZ/EL correction calculation on the basis of accumulated data. A method of calculating a wind force correcting torque in the second embodiment is the same as that described in the first embodiment (FIG. 5). The telescope system can obtain, after entering an operation stage, an enormous amount of data (empirical rules) concerning a wind force correcting torque and a relation between a direction and a pointing (directivity) error of the telescope system. Thus, the artificial intelligence, which updates, using the empirical rules, a table consisting of a matrix for calculating optimum AZ and EL correction amounts from the wind force correcting torque, is built in a control unit.

When the antenna is assembled, as in the first embodiment, values calculated by the FEM are substituted in the correction constants $C_{AZ}$ and $C_{EL}$ and parameters of the correction constants $C_{AZ}$ and $C_{EL}$ are updated when the telescope system is operated. As one of methods of updating the parameters, it is possible to examine a method of analyzing a radio wave intensity from an image obtained by a receiver of the antenna, calculating a pointing error from deviation between a target celestial body and a maximum radio wave intensity, and resetting the correction constants $C_{AZ}$ and $C_{EL}$ to reduce the pointing error. In the respective directions of the telescope, for example, after setting an EL angle to 0° and rotating the AZ once to set parameters, the EL angle is increased by 10° every time to perform the same setting. Consequently, the table is updated. This makes it possible to obtain the telescope system that has higher pointing accuracy compared with AZ/EL correction value calculation depending only on the simulation according to the FEM.

According to the invention, even if the pedestal unit or the like of the telescope system is deformed by the wind force, it is possible to obtain a telescope system with higher directivity even under the influence of the wind force by building an algorithm for correcting the deformation in a control system.

What is claimed is:

1. A telescope system comprising:
   a main reflector unit;
   a pedestal unit that bears the main reflector unit to be rotatable around AZ and EL axes; and
   a motor that drives the main reflector unit,
   the telescope system correcting deformation of the main reflector unit and the pedestal unit due to the wind force to improve pointing accuracy of the main reflector unit and the pedestal unit,
   wherein the telescope system detects motor torques on the AZ axis and the EL axis, predicts deformation of a telescope due to the wind force from torque signals of the motor torques and a pointing error due to the deformation, and feeds back the deformation and the pointing error to AZ and EL command values to perform correction of the pointing error.

2. A telescope system according to claim 1, wherein the telescope system simulates deformation of the main reflector unit and the pedestal unit with an FEM from a value obtained by observing, with a wind tunnel test, a wind force applied to the main reflector unit and the pedestal unit in advance, calculates a pointing error from a result of the simulation, calculates a constant (a gain) with which the pointing error is minimized in total when the telescope system receives various winds while taking various directions, and establishes a feedback loop.

3. A telescope system according to claim 1, wherein the telescope system corrects the positioning error before correction, which is obtained by the simulation, by subtracting a value, which is obtained by multiplying a moment calculated by the wind tunnel test by the constant with which the pointing error is minimized, from the positioning error.

4. A telescope system according to claim 1, wherein a direct drive motor is used as the motor.

5. A telescope system according to claim 4, wherein, at an operation stage of the telescope, the telescope system accumulates empirical data concerning correlation between pointing errors and outputs of the direct drive motor in a computer, adds, to the computer, a function of always calculating and updating a matrix for calculating optimum AZ and EL command values from a direction of the telescope and an output torque of the direct drive motor, and performs feedback control always using an optimum correction value.

6. A telescope system according to claim 5, wherein an artificial intelligence for updating, using empirical rules, a matrix table for calculating optimum AZ and EL correction amounts from a wind correcting torque is built in the computer.

7. A telescope system according to claim 1, wherein further comprising:
   a control system that drives the motor on the basis of AZ and EL command values;
   an encoder that detects rotation angles of the AZ and EL axes; and
   a torque detecting unit that detects an output torque of the motor,
   wherein the telescope system feeds back an angle signal of the encoder to the control system to control the angle signal to be equal to the command values and feeds back a torque signal of the torque detecting unit to the command values to correct a pointing error involved in deformation of a telescope due to a wind force to an optimum value.

* * * * *